Figure 1:
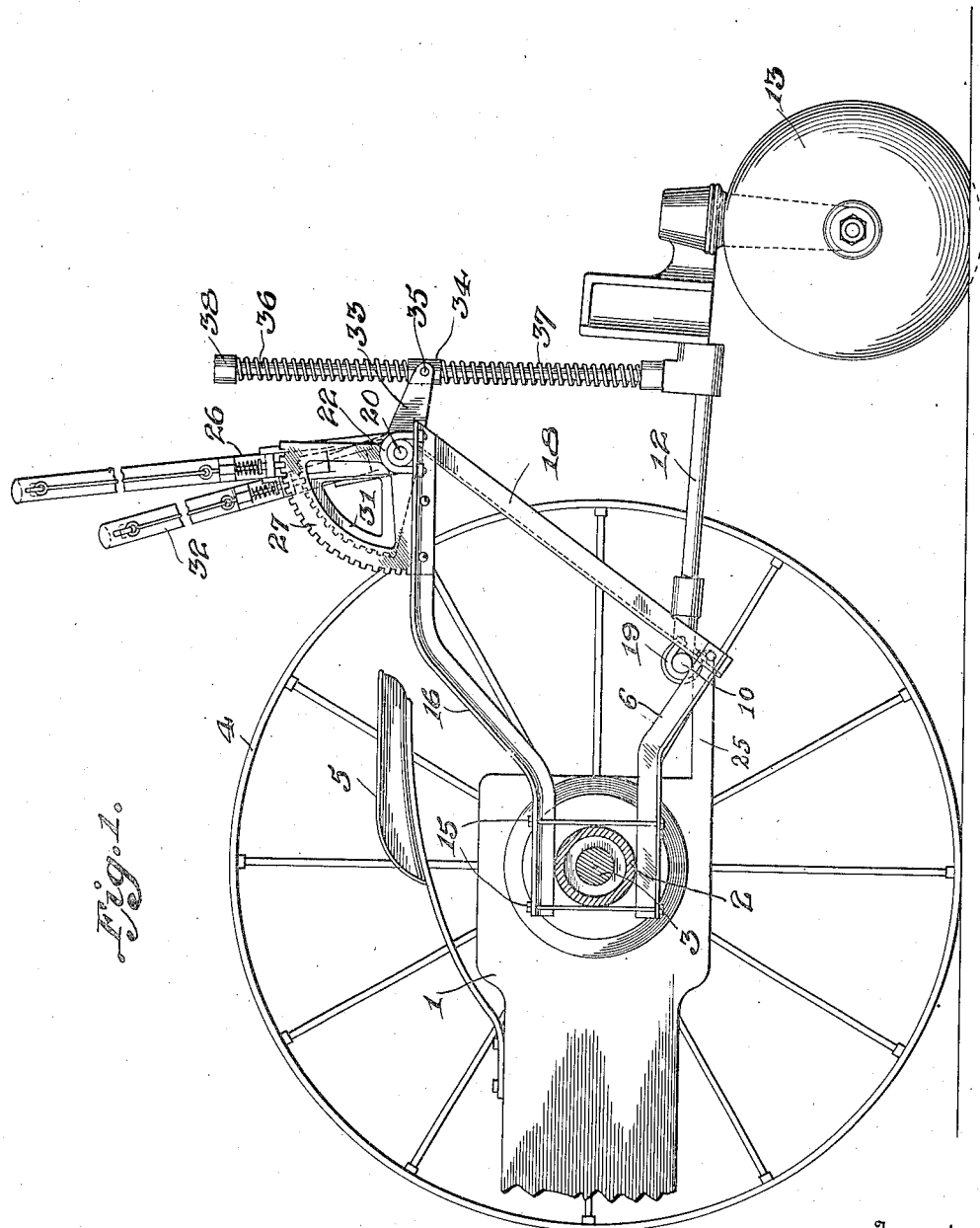

Sept. 23, 1924.

J. Q. BILLINGS 1,509,748

TRACTOR ATTACHMENT

Filed Aug. 22, 1922

2 Sheets-Sheet 1

Inventor

J. Q. Billings

By Mason Fenwick & Lawrence

Attorneys

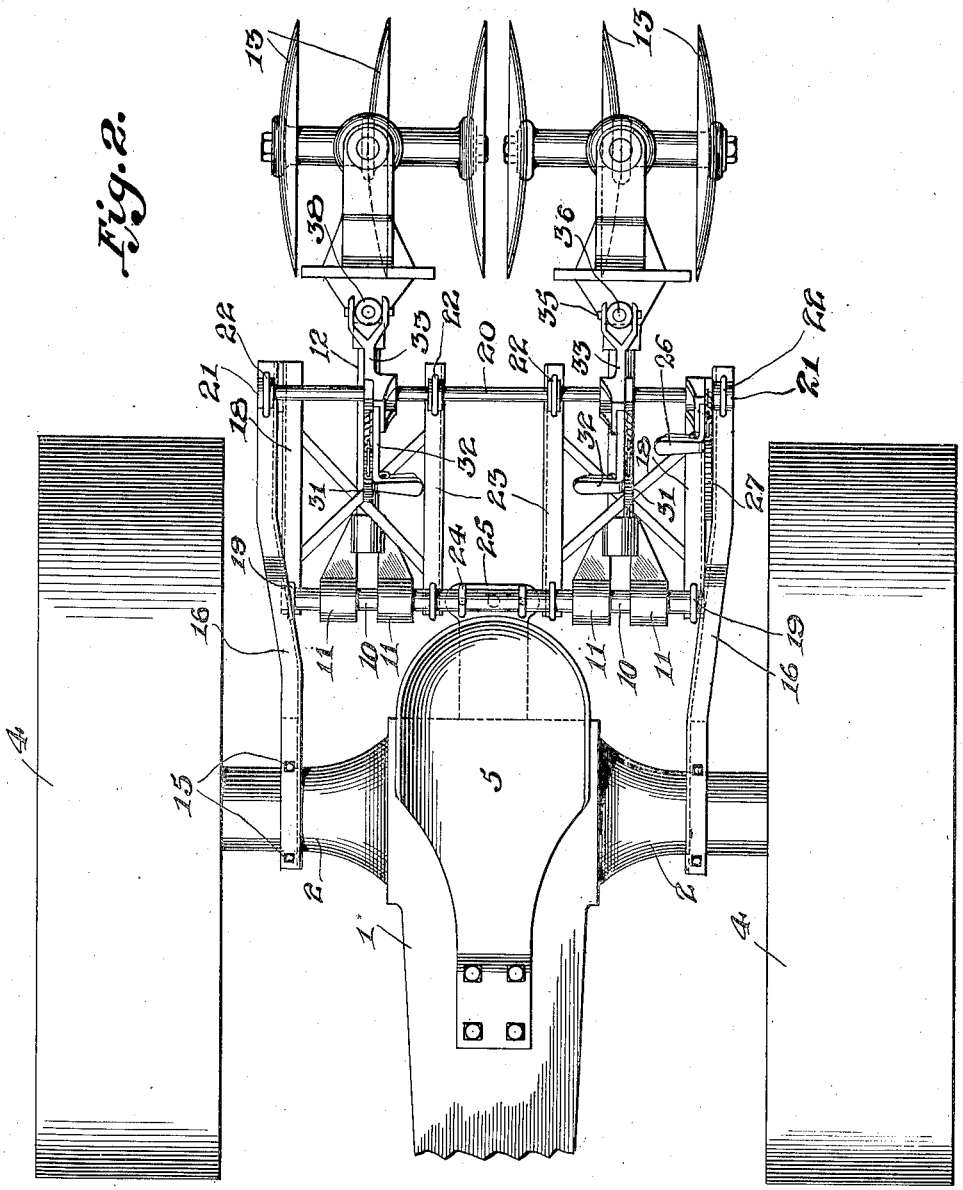

Patented Sept. 23, 1924.

1,509,748

UNITED STATES PATENT OFFICE.

JOSIAH QUINCY BILLINGS, OF SHREVEPORT, LOUISIANA.

TRACTOR ATTACHMENT.

Application filed August 22, 1922. Serial No. 583,655.

*To all whom it may concern:*

Be it known that I, JOSIAH Q. BILLINGS, a citizen of the United States, residing at Shreveport, in the parish of Caddo and State of Louisiana, have invented certain new and useful Improvements in Tractor Attachments; and I do hereby declare the following to be a full, clear, and exact description of the invention, such as will enable others skilled in the art to which it appertains to make and use the same.

This invention has for its object the provision of means whereby agricultural implements can be attached to and drawn along by a tractor.

The various features of novelty and invention will appear from the detailed description taken in connection with the accompanying drawings forming part of this specification, the scope of the invention being defined in the appended claim.

Referring to the drawings—

Figure 1 is a side elevation of the tractor attachment showing a disk harrow or pulverizer as being connected to said attachment, the near wheel being removed, and Fig. 2 is a plan view of Fig. 1.

In the drawings, 1 indicates the rear portion of a well known tractor, 2 the rear axle housing thereof, 3 the divided driving shafts for driving the wheels 4 at the ends of the housing 2, and 5 indicates the operator's seat.

Mounted on the housing 2 and extending rearwardly thereof is a frame comprising a pair of side rails 6 and 16. Of each pair of side rails, the upper rail 16 is longer than the lower rail 6 which constitutes in effect a draw bar as will hereinafter appear. The housing 2 is adapted to be clamped between said rails at one of their ends by any suitable means such as bolts 15. The other ends of said rails are maintained in spaced relation by means of the brace 18.

10 indicates a shaft arranged between the wheels 4 and attached to said frame as by U-clips 19 passing through said braces 18. Mounted loose on this shaft are a pair of hangers 11 each preferably comprising a bifurcated member, said hangers having sockets adapted to receive one end of links 12, the other end of said links being adapted for connection to an agricultural implement such as harrow sections 13. It will now be seen that the links 12 are swingably mounted on the shaft 10.

Rotatably mounted at the outer ends of the upper rail 16 is a transversely extending shaft 20 which is mounted in collar bearings 21 clamped to the rails by U-clips 22. Extending between shafts 10 and 20 are braces 23 which prevent bending of the shaft 20. The shaft 10 is also preferably braced against flexing by means of a bracket 25 diagrammatically illustrated in the drawings as extending from the housing 2 midway the wheels, clips 24 being shown as securing said shaft to said bracket.

A pair of swingable links 12 have been shown, each link carrying a section of an agricultural implement. In order to permit said implements to be elevated together or separately, suitable adjusting or elevating means have been provided and which will now be described.

Keyed to the shaft 20 adjacent one end thereof is an operating lever 26 and affixed to the rail 16 is a sector rack 27 with which said lever is adapted to cooperate. Keyed to the shaft 20 are two sector racks 31 and loose on the shaft 20 adjacent each rack are bell crank levers 32, the arms or cranks 33 thereof terminating in a jaw adapted to receive a sleeve 34, there being a pivotal connection as at 35 between said sleeve and jaw. Extending upwardly from each of the links 12 is a link or rod 36 which slidably receives a sleeve or block 35. Mounted on this rod on opposite sides of the block 35 are springs 37, the upper end of said rod having a suitable head 38 to confine the spring on said rod.

When the bell crank levers 32 are locked to their racks 31 and the lever 26 is locked to the sector rack 27, the free end of the links 12 will nevertheless, by reason of the spring arrangement, be cushioned for up and down movement relative to the crank arms 33. This movement allows the agricultural implement to adjust itself to irregularities or obstructions as will be readily understood.

When it is desired to adjust one of the implement sections, it is merely necessary to release the appropriate lever 32 from its rack and secure the same in a new position with respect to said rack.

When it is desired to adjust both of said implement sections, the lever 26 is released from its rack and the shaft 20 rotated. Inasmuch as the bell cranks 32 are normally locked to the shaft 20 by reason of their connection with their sector racks, the crank arms 33 of said levers 32 will serve to elevate the links as will now be apparent.

The above described construction provides an attachment which may be cheaply manufactured and which is efficient in use. I have described the attachment with considerable particularity of detail, but I desire it to be understood that I intend no limitations except as may be defined by the appended claim.

What I claim is:

An attachment for tractors comprising in combination laterally spaced drawbars, a support extending upwardly and rearwardly from the rear end of the respective drawbars, a top frame bar secured to the upper end of said support and extending forwardly, the adjacent forward ends of said frame bars and draw bars being spaced apart and adapted to receive the rear axle housing between them, a cross bar extending between and anchored adjacent the rear ends of the drawbars, links swingably mounted on said cross bar and adapted for connection at their rear ends to an implement, a shaft extending between the rear ends of the frame bars and bracing the latter, and link elevating means mounted on said frame bars and shaft.

In testimony whereof I affix my signature.

JOSIAH QUINCY BILLINGS.